United States Patent
Fasham et al.

(10) Patent No.: US 8,136,955 B2
(45) Date of Patent: Mar. 20, 2012

(54) ILLUMINATION SYSTEM AND DISPLAY INCLUDING SAME

(75) Inventors: Stephen James Fasham, Highworth (GB); David James Montgomery, Bampton (GB); Emma Jayne Walton, Oxford (GB); Tong Zhang, Abingdon (GB)

(73) Assignee: Sharp Kabushiki Kaisha, Osaka (JP)

( * ) Notice: Subject to any disclaimer, the term of this patent is extended or adjusted under 35 U.S.C. 154(b) by 435 days.

(21) Appl. No.: 12/446,277

(22) PCT Filed: Oct. 18, 2007

(86) PCT No.: PCT/JP2007/070755
§ 371 (c)(1),
(2), (4) Date: Apr. 20, 2009

(87) PCT Pub. No.: WO2008/050810
PCT Pub. Date: May 2, 2008

(65) Prior Publication Data
US 2010/0296268 A1      Nov. 25, 2010

(30) Foreign Application Priority Data
Oct. 24, 2006   (GB) .................................. 0621137.9

(51) Int. Cl.
*G09F 13/04* (2006.01)
(52) U.S. Cl. ................ 362/97.1; 362/249.02; 362/97.03
(58) Field of Classification Search .................... 362/29, 362/30, 97.1–97.3, 227, 241, 244, 245, 249.01, 362/249.02, 326, 327, 330, 331, 346, 347, 362/544, 545, 561, 800, 812; 349/57, 58, 349/61, 62, 63, 67, 69
See application file for complete search history.

(56) References Cited

U.S. PATENT DOCUMENTS

| 4,612,295 A | 9/1986 | Sagara |
| 6,371,623 B1 | 4/2002 | Toyoda |

(Continued)

FOREIGN PATENT DOCUMENTS

CN      2731497 Y       10/2005

(Continued)

OTHER PUBLICATIONS

International Search Report for corresponding application No. PCT/JP2007/070755 completed Jan. 1, 2009.

(Continued)

*Primary Examiner* — Hargobind S Sawhney
(74) *Attorney, Agent, or Firm* — Renner, Otto, Boisselle & Sklar, LLP

(57) ABSTRACT

An illumination system comprises at least one light source (2) and a light-guide (1). A first part of the light-guide (1) is defined by a surface (12) for light emission and a back surface (13), and a second part of the light-guide is defined by a light receiving surface (14) and a light reflecting surface (15). The light source (2) is disposed adjacent or substantially adjacent to the light receiving surface (14), and light from the light source enters the light-guide through the light receiving surface (14), and is reflected by the light reflecting surface (15) into the first part of the light-guide. Light is emitted from the waveguide through the surface (12) for light emission, and may be used to illuminate, for example, a display device placed over the surface (12) for light emission. The light source and the light receiving surface are on the same side of the waveguide as the surface for light emission.

33 Claims, 9 Drawing Sheets

U.S. PATENT DOCUMENTS

| | | | |
|---|---|---|---|
| 6,904,225 B2 | 6/2005 | Tamura et al. | |
| 6,951,401 B2 | 10/2005 | Van Hees et al. | |
| 7,230,603 B2 * | 6/2007 | Yamamoto et al. | 345/102 |
| 2005/0093813 A1 | 5/2005 | Yamamoto et al. | |

FOREIGN PATENT DOCUMENTS

| | | |
|---|---|---|
| JP | 04-322204 | 11/1992 |
| JP | 2003-031016 | 1/2003 |
| JP | 2003-279971 | 10/2003 |

OTHER PUBLICATIONS

British Search Report for corresponding Application No. GB0621137.9 dated Feb. 12, 2007.

* cited by examiner

ILLUMINATION SYSTEM AND DISPLAY INCLUDING SAME

TECHNICAL FIELD

The present invention relates to an illumination system, for example an illumination system that may be used as a backlight for a display device that is, wholly or partially, a transmissive spatial light modulator such as a liquid crystal display device. It also relates to a display incorporating such an illumination system.

It is known for a display device that is, wholly or partially, a transmissive spatial light modulator to be illuminated by an illumination system disposed behind the display device (by "behind the display device" is meant that the illumination system is disposed on the opposite side of the display device to an observer). Such an illumination system is generally known as a backlight.

BACKGROUND ART

One known type of backlight, described in U.S. Pat. No. 4,612,295 and shown schematically in side view in FIG. 1(a) and in plan view from above in FIG. 1(b), comprises a transparent light-guide 1. The light-guide 1 may be a flat slab-like light-guide or it may be tapered in that its thickness decreases with distance across the light-guide. One or more light sources 2, for example fluorescent tubes, are positioned along one or more edges of the light-guide (only one fluorescent tube is shown in FIGS. 1(a) and 1(b) for simplicity of explanation), and light from the or each light source 2 enters the light-guide 1, and propagates within the light-guide according to the phenomenon of "total internal reflection". One of the larger plane surfaces of the light-guide is provided with a scattering structure (not shown) so that the light propagating within the light-guide is scattered out of the light-guide with an intensity that is preferably substantially uniform across the area of the light-guide. The light guide 1 is placed behind a transmissive display device denoted generally at 3 in FIG. 1(a), so that light scattered out the light guide passes through the display device 3.

A backlight of the general type shown in FIG. 1 may alternatively use light-emitting diodes (LEDs) as the light sources in place of fluorescent tubes. U.S. Pat. No. 6,904,225 describes a particular type of scattering structure for extracting light from the light-guide, which comprises a plurality of scatter dots provided on a surface of the light-guide. The scatter dot arrangement, defined by the particular placing of the dots, produces even out-scattered light from the light-guide by varying the number density of scatter dots provided on the light-guide to compensate for variations over the area of the light-guide in the intensity of light propagating within the waveguide.

In particular an LED emits light over a certain angular range, and typically has dimensions of the order of 1 mm whereas a light-guide of a backlight for a display may typically have dimensions of the order of 10 cm or greater. Thus, as shown in FIG. 2 which is taken from U.S. Pat. No. 6,904,225 and which is a plan view from above of the light-guide, some regions 4 of the light-guide receive relatively low intensity of light from the light source 2 when an LED is used as the light source. These regions 4 of the light-guide that receive relatively low intensity of light from the light source 2 are provided with a higher number density of scatter dots 5, so that the intensity of light emitted from the light-guide remains approximately uniform over the area of the light-guide.

A backlight of the general type shown in FIG. 1 is widely used in rear-illuminated displays, especially for small LCD displays used in mobile devices and small monitors. Their application to large monitors is also possible.

In general, backlights of the type shown in FIGS. 1(a) and 1(b) that use LEDs as light sources employ white light LEDs. As described in more detail below, a white light LED comprises a phosphor that absorbs some of the light emitted by the light-emitting element of the LED and re-emits light at a wavelength different from the original emission wavelength of the light-emitting element, so that the output from the LED contains a component re-emitted by the phosphor in addition to the unabsorbed portion of the output from the light-emitting element. Alternatively, backlights of the type shown in FIGS. 1(a) and 1(b) may use single colour LEDs (for example, red, green and blue LEDs)—however, this is less common owing to the need to provide a light transition section in which light from the red, green and blue LEDs can mix to give white light.

FIG. 3 is a schematic cross-section through a typical display package 6 consisting of a transmissive display device 3 and a backlight of the general type shown in FIG. 1, in which LEDs are used as the light source(s) 2. (Only one light source is shown in FIG. 3.) A reflector 11 is preferably disposed behind the light-guide 1, so that any light that is emitted from the rear surface of the light-guide 1, away from the display device 3, is reflected by the reflector back towards the display device 3. This improves the output efficiency of the display package.

The transmissive display device 3 may, for example, be a liquid crystal display device.

The need to ensure good coupling of light from the LED into the light-guide 1 means that the thickness t of the light-guide 1 cannot be significantly less than the diameter d of the LED. LEDs having a diameter of 0.8 mm or even 0.6 mm are now commercially available and, if such LEDs are used, the light-guide 1 is required to have a thickness t of at least 0.8 mm or 0.6 mm. (In the case of a tapered waveguide, the thickness t of the waveguide must be at least 0.8 mm or 0.6 mm at at least one point.)

There is a move, especially in the mobile devices market, towards thinner display packages. This is mainly to allow more convenient handling, to reduce cost and to allow more functionality to be fitted into the casing; moreover, a thinner device is more attractive to consumers. For an. LCD module (for example), the thickness of the backlight unit is a significant part of the overall thickness. It is therefore desirable to reduce the thickness of the backlight unit, to enable the thickness of the display package to be reduced.

An LED is typically manufactured in the form of an LED package which consists of a light-emitting element typically having dimensions of the order of 300 μm, surrounded by a reflector to collimate light output by the light-emitting element. In the case of a white light LED package, the light-emitting element generally emits light in the blue or violet region of the spectrum, and the light-emitting element is further surrounded by a yellow phosphor which absorbs some of the blue/violet light from the light-emitting element and re-radiates in the yellow region of the spectrum; the yellow light re-radiated by the phosphor and the unabsorbed part of the blue/violet light from the light-emitting element combine to give a white light output. The reflector is typically made from resin, with a typical thickness of 60 μm. In an LED package of this construction, blue/violet light from the light-emitting element is incident on the resin reflector, and the resin reflector degrades as a result. It is therefore undesirable to reduce the thickness of the LED package, as this would shorten the lifetime of the LED package.

In principle, the resin reflector could be replaced by a metallic reflector. However, in order to decrease the thickness of the LED package by replacing the resin reflector with a metallic reflector, it would be necessary for the metal reflector to be thinner than the current resin reflector, ie to have a thickness of less than 60 μm. A metallic reflector with a thickness of less than 60 μm would be structurally weak and liable to damage, so that the lifetime of the LED package would again be shortened; such a thin metallic reflector would also be difficult to manufacture.

Similarly, where the backlight is provided with one or more fluorescent tubes as the light source(s), the fluorescent tube(s) will in practice have a diameter of around 0.6-0.8 mm. Fluorescent tubes with a diameter of down to 0.3 mm are known but, as with very small LEDs, such very thin fluorescent tubes have a short lifetime and a low light output.

As is explained with reference to FIG. 2 above, an LED emits light over a certain angular range, and typically has dimensions that are much less than the dimensions of a light-guide of a backlight. It is therefore known to provide a light-guide with a light transition section, or light mixing section, in which light from an LED can diverge to cover the full width of a light-guide or, if a plurality of LEDs are provided, in which light from an LED can diverge so as to meet light emanating from an adjacent LED. U.S. Pat. No. 6, 951,401 discloses a backlight in which such a light transition section is placed parallel to and spaced from the main body of a light-guide, to make the backlight more compact by placing the light transition section behind the main body of the light-guide. This is illustrated in FIG. 4, which is a cross-section through a backlight of U.S. Pat. No. 6,951,401.

In the backlight of U.S. Pat. No. 6,951,401 shown in FIG. 4, light from a light source 2, in this example an LED, is coupled into a light transition panel 7. The light transition panel 7 is disposed parallel to the main body of the light-guide 1. The length of the light transition panel 7 is chosen such that the desired divergence of light from the LED can occur as the light passes along the light transition panel 7. Moreover, U.S. Pat. No. 6,951,401 uses single colour LEDs, and light from the different LEDs is mixed in the light transition panel 7 to give white light. Light leaving the light transition panel 7 is coupled into the main body of the light guide 1 by a curved reflector 8 that defines a curved waveguide. Scattering structures 9 are provided on the rear surface 1a of the light-guide, for scattering light out of the front surface 1b of the light-guide.

In the backlight of U.S. Pat. No. 6,951,401, the thickness of each of the light transition section 7 and the light-guide 1 is required to be at least as great as the diameter of the LED, to ensure good coupling of light into the light transition section and from the light transition section 7 into the light-guide 1.

U.S. Pat. No. 6,371,623 also addresses the need for a light transition section in which light from an LED can diverge to cover the full width of a light-guide. As shown in FIG. 5(a), U.S. Pat. No. 6,371,623 teaches placing a prism sheet 10 in the path of light from an LED, to increase the divergence of light from the LED and so reduce the required length of the light transition section 7.

U.S. Pat. No. 6,371,623 also teaches that the LED may be arranged to emit light approximately perpendicular to the plane of the light-guide 1, as shown in FIG. 5(b). The prism sheet 10 is placed between the LED and the light-guide 1. This allows the length of the backlight system to be reduced—in FIG. 5(a) the length of the backlight system is B+L, where B is the length of the light transition section 7 and L is the length of the light-emitting part of the light-guide, but in FIG. 5(b) the length of the backlight system in the direction of the light-guide is $B_2+L$, where $B_2$ is the component of the length of the light transition section 7 that extends in the direction of the light-guide. The overall length of the light transition section 7 in FIG. 5(b) is given by $B_1+B_2$ and, for a given prism sheet, $B_1+B_2=B$, where B is the length of light transition section 7 in FIG. 5(a). Thus, the length of the backlight system in the direction of the light-guide in FIG. 5(b) will be less than the length of the backlight system in FIG. 5(a), since $B_2+L<B+L$.

JP-A-4 322 204 describes an illumination system having a light guide and a light source. Light from the light source is received in a light gathering section, and passes through a light guide joint to the light guide.

JP-A-2003 279971 relates to a display having an LC section and a backlight for illuminating the LC section. The backlight section has a light guide plate and a light source. The light source illuminates part of the back surface of the light guide plate, and light is emitted from the front surface of the light guide plate.

DISCLOSURE OF INVENTION

A first aspect of the present invention provides an illumination system comprising a light source and a light-guide; wherein a first part of the light-guide is defined by a surface for light emission and a back surface generally opposed to the surface for light emission, and a second part of the light-guide is defined by a light receiving surface and a light reflecting surface, the light reflecting surface being for reflecting light entering the second part of the light-guide through the light receiving surface into the first part of the light-guide; wherein the first part of the light-guide and the second part of the light-guide define an optically continuous refractive medium; wherein the surface for light emission, the light receiving surface, the light reflecting surface and the back surface are non-coincident with one another; wherein the light source is disposed adjacent or substantially adjacent to the light receiving surface of the light-guide and wherein the light source and the light receiving surface are on the same side of the waveguide as the surface for light emission.

Specifying that the light source and the light receiving surface are on the same side of the waveguide as the surface for light emission is intended to exclude the possibility that the light receiving surface and/or the light source are disposed wholly or partially behind the rear surface of the light guide.

In JP-A-4 322 204 the light source projects wholly or partially behind the rear surface of the light guide (which is on the opposite side of the light guide to the light-emitting surface). When the illumination system of JP-A-4 322 204 is incorporated in a display, the projection of the light source behind the rear surface of the light guide contributes to the overall thickness of the display. In an illumination system of the present invention, in contrast, by providing the light source on the same side of the light guide as the surface for light emission it is possible to ensure that no part of the illumination system projects behind the rear surface of the waveguide and, when an illumination system of the invention is used in a display, thus contributes to the overall thickness of the display. An illumination system of the present invention can therefore, when incorporated in a display, provide a display of reduced thickness compared to a display incorporating an illumination system of JP-A-4 322 204.

The light source is arranged to direct light onto the light receiving surface, and it is therefore necessary that the dimensions of the light receiving surface are at least as great as the dimensions of the light-emitting area of the light source. However, provision of the light reflecting surface for reflecting light entering the light-guide through the light receiving surface means that the light receiving surface is not required to extend across the thickness direction of the light-guide between the surface for light emission and the back surface. The thickness of the light guide, measured between the surface for light emission and the back surface, is therefore not constrained to be equal to or greater than the dimensions of the light-emitting area of the light source, and may be made smaller than the dimensions of the light-emitting area of the light source. The present invention thus allows the thickness of the light-guide to be reduced, while still using, for example, a conventional 0.6 mm or 0.8 mm diameter light source—and since a conventional 0.6 mm or 0.8 mm light source may be used, the problems with short lifetime and low light output associated with smaller light sources are avoided.

The thickness of the light-guide may in principle be reduced to the minimum required to provide the light-guide with sufficient physical strength and the light-guide may for example have a thickness of 0.3 mm or lower, or even 0.2 mm or lower.

The surface for light emission may be flat or substantially flat. This allows the illumination system to used with a display device having a flat or substantially flat input face.

The light emission surface may be continuous or substantially continuous with the light receiving surface. This may simplify the manufacture of the light guide.

The light emission surface may be inclined with respect to the light receiving surface.

The surface for light emission may be inclined away from the light receiving surface. This decreases the height of the light source as measured perpendicular to the light emission surface, and so increases the height of light source that may be used. It also reduces the angle through which light from the light source must be reflected.

Alternatively, the light emission surface may be inclined towards the light receiving surface. This may provide an improved light capture efficiency.

The light emission surface may be substantially perpendicular to the light receiving surface. In this embodiment it is the diameter of the light source that is restricted rather than the height of the light source, and this allows greater design choice.

The first part of the waveguide may be integral with the second part of waveguide. This eliminates the possibility of light loss owing to absorption or scattering at an interface between the first part of the waveguide and the second part of the waveguide.

The light reflecting surface may be non-planar. It may be convex in cross-section. This may increase the light capture efficiency, compared to a planar light reflecting surface.

The light reflecting surface may be defined by a polynomial, exponential, or hyperbolic curve. It may be defined by a quadratic curve. This may provide a particularly good light capture efficiency.

The illumination system may comprise two or more light sources, each light source being disposed adjacent or substantially adjacent to a respective light receiving surface of the light-guide. This provides an illumination system with a higher output light intensity, compared to an illumination system having only one light source. It may also provide an output light intensity that is more uniform over the area of the surface for light emission.

The light-guide may further comprise a second light receiving surface and a second light reflecting surface, the second light reflecting surface being for reflecting light entering the light-guide through the second light receiving surface into the first part of the light-guide; and the illumination system may further comprise a second light source disposed adjacent or substantially adjacent to the second light receiving surface of the light-guide.

The second light receiving surface and the second light reflecting surface may define a third part of the light-guide, and wherein the first part of the light-guide, the second part of the light-guide and the third part of the light-guide define an optically continuous refractive medium.

The illumination system may comprise two or more light sources, each light source being disposed adjacent or substantially adjacent to the light receiving surface. This provide an illumination system with a higher output light intensity, compared to an illumination system having only one light source. It may also provide an output light intensity that is more uniform over the area of the surface for light emission.

The or each light source may be arranged to emit light perpendicular or substantially perpendicular to the respective light receiving surface. This increases the efficiency of coupling light into the waveguide.

The or each light source may be an LED.

The first part of the light-guide may have a thickness of 0.3 mm or less. It may have a thickness of 0.2 mm or less.

The illumination system may further comprise a reflector disposed over the light-reflecting surface. It may further comprise a second reflector disposed over the second light-reflecting surface. Any light that would otherwise have passed out of the light reflecting surface(s) will be recycled by the reflector(s), thereby increasing the light capture efficiency.

The illumination system may further comprise a third reflector disposed over a region of the light-receiving surface where no light source is provided. Any light that would otherwise have passed out of the light receiving surface will be recycled by the reflector, thereby increasing the light capture efficiency.

The illumination system may further comprise a fourth reflector disposed over a region of the second light-receiving surface where no second light source is provided.

The profile of the light reflecting surface may vary across the breadth of the light guide. This may improve light divergence in the waveguide, and/or may improve in-coupling efficiency for high angle rays.

The light reflecting surface may comprise one or more segments, a cross-section through the or each segment along the breadth of the light-guide having a curved profile.

The or each light source may be disposed above a corresponding segment.

Each segment may be a portion of the surface of a solid of revolution.

The or each axis defining the solid(s) of revolution may be on the opposite side of the light-guide to the light reflecting surface.

Alternatively, the or each axis defining the solid(s) of revolution may be on the same side of the light-guide as the light reflecting surface.

A second aspect of the present invention provides a display comprising: a display device; and an illumination system of the first aspect for illuminating the display device, a light input face of the display device being disposed substantially aligned with the surface for light emission of the light guide. With the display device positioned with its input surface substantially aligned with the surface for light emission of the light guide, the light source is beside the display device (for example as shown in FIG. 6). Only one of the thickness of the display device or the height of the light source, whichever is greater, contributes to the overall thickness of the display.

The display device may be a transmissive display device, and the illumination system may be disposed on the opposite side of the display device to an intended viewing position of the display device.

Alternatively, the display device may a reflective or transflective display device, and the illumination system may be disposed on the same side of the display device as an intended viewing position of the display device.

Additional objects, features, and strengths of the present invention will be made clear by the description below. Further, the advantages of the present invention will be evident from the following explanation in reference to the drawings.

BRIEF DESCRIPTION OF DRAWINGS

Preferred embodiments of the present invention will now be described by way of illustrative examples with reference to the accompanying figures, in which.

BEST MODE FOR CARRYING OUT THE INVENTION

Figure 1A:
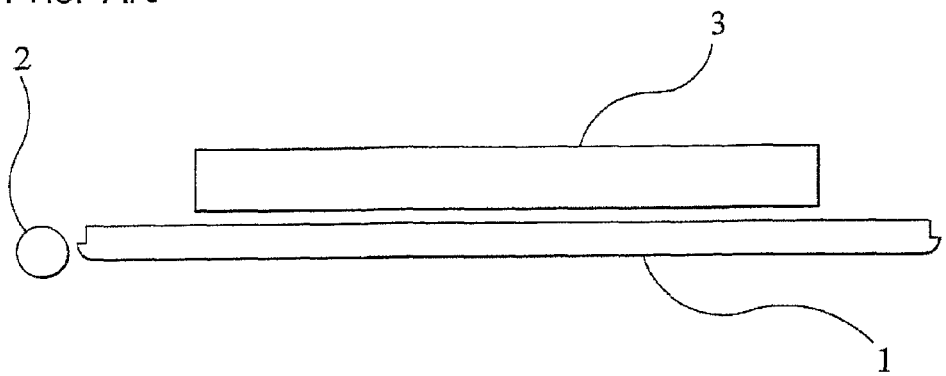
FIG. 1(a) is a schematic side view of a display device illuminated by a backlight.
Figure 1B:
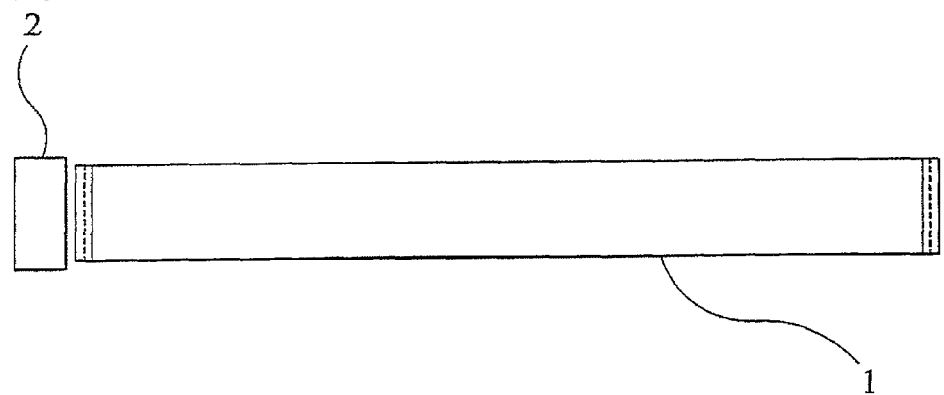
FIG. 1(b) is a schematic plan view of the backlight of FIG. 1(a)
Figure 2:
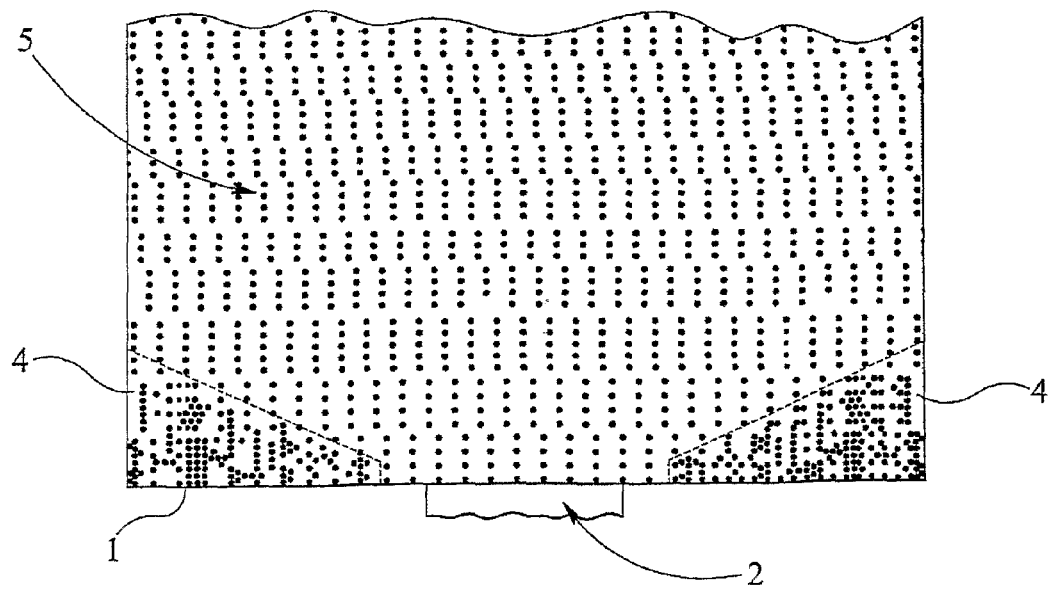
FIG. 2 is a schematic plan view of a backlight showing a possible arrangement of scattering dots.

Like reference numerals represent like components throughout the description and drawings.

Figure 6:
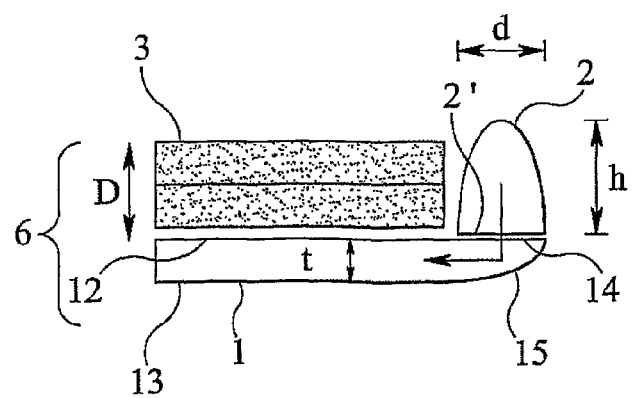
FIG. 6 is a schematic view of a display device incorporating an illumination system according to the present invention.

FIG. 6 is a schematic illustration of a display 6 that incorporates a display device 3 and an illumination system of the present invention for illuminating the display device 3. In FIG. 6 the display device 3 is a transmissive display device, and the illumination system acts as a backlight—that is, the illumination system 2 is disposed on the opposite side of the display device 3 to an intended viewing position. The nature of the display device 3 is not material to the present invention, and any conventional transmissive display device such as, for example, a liquid crystal display device (LCD) may be used. The display device 3 will therefore not be described further.

The illumination system of the display 6 shown in FIG. 3 again comprises a light guide 1 and a light source 2. Light from the light source 2 enters the light-guide 1, and is emitted from a light-emission surface 12 of the light-guide. In the display package of FIG. 6, the display device 3 is placed over the light-emission surface 12 of the light-guide so that its input surface is aligned or is substantially aligned with the light-emission surface 12 of the light-guide, and the area of the light-emission surface 12 of the light-guide corresponds generally to the area of the display device 3.

In an illumination system of the present invention, a first part of the light-guide 1 is defined by the light-emission surface 12 and a back surface 13 of the light-guide 1. A second part of the light-guide 1 is defined by a light-receiving surface 14, through which light from a light source 2 enters the second part of the light-guide 1, and a light-reflecting surface 15. The light-reflecting surface 15 reflects light that has entered the second part of the light-guide through the light-receiving surface 14 and directs the light into the first part of the light-guide. Light that enters the first part of the light-guide propagates within the waveguide and is scattered out of the waveguide in a known manner by suitable outcoupling structures (not shown) provided, for example, on the back face 13 of the light guide. The outcoupling structures are chosen for the intended application of the illumination system; they may be conventional and will not be described further.

The first part of the light-guide and the second part of the light-guide define an optically continuous refractive medium, such that there is no optical loss as light passes from the second part of the light-guide to the first part of the light-guide. The surface for light-emission 12, the back surface 13, the light-receiving surface 14, and the light-reflecting surface 15 are not coincident with one another.

Figure 7:
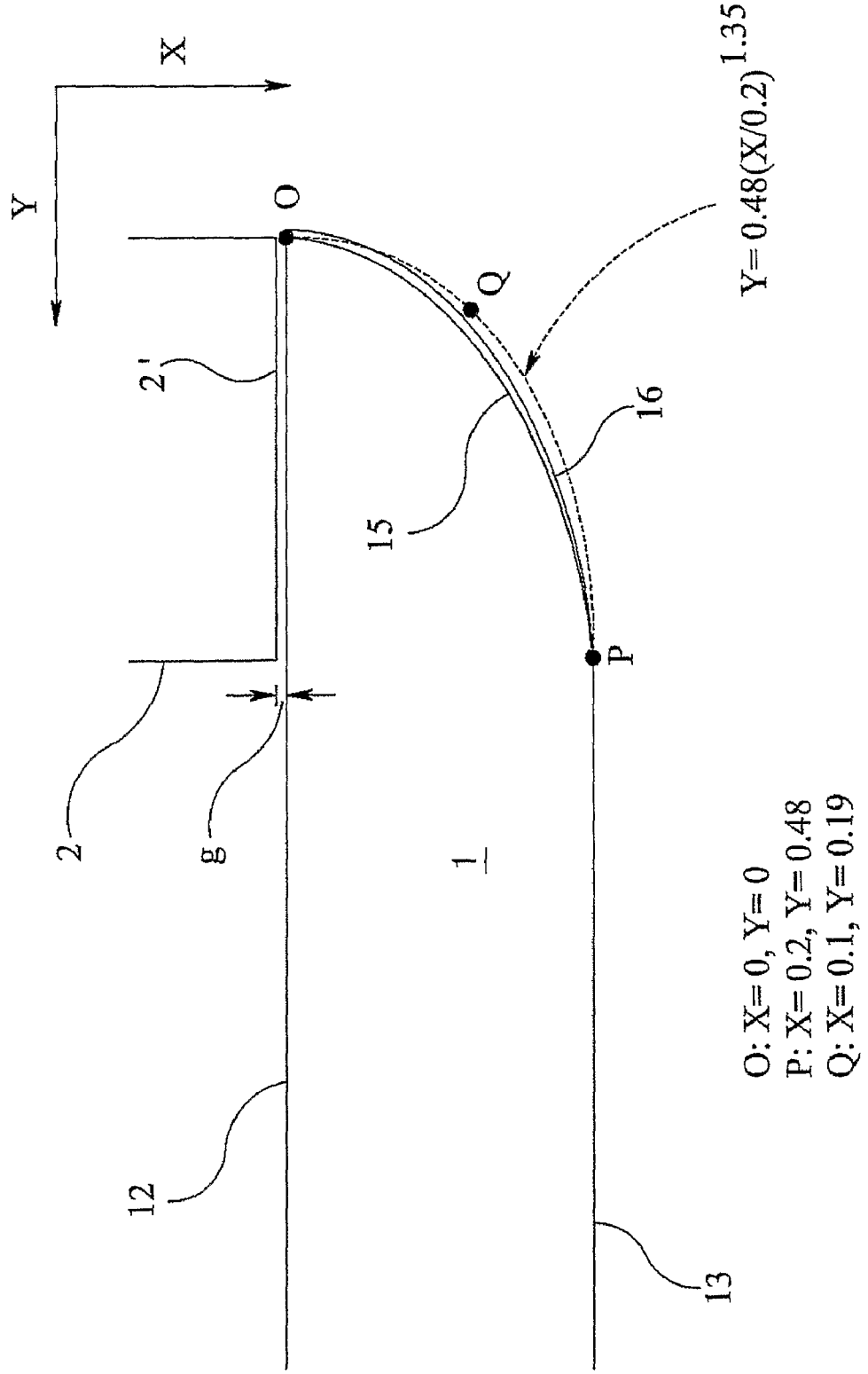
FIG. 7 is a partial enlarged view of the illumination system of the display of FIG. 6.

The light source 2 is disposed adjacent or substantially adjacent to the light-receiving surface 14 of the light-guide. FIG. 6 and FIG. 7 (which is a partial enlarged view of FIG. 6) each show the light-source 2 arranged such that there is a small air gap between the light-emitting surface 2' of the light source and the light-receiving surface 14 of the light-guide, but in principle the light-source 2 could be disposed with its light-emitting surface directly on the light-receiving surface 14 of the light-guide 2. Alternatively, the light source 2 may be adhered to the light-receiving surface of the light-guide using a suitable transparent adhesive.

In the embodiment of FIG. 6 the light-receiving surface 14 of the light-guide is continuous with the light-emitting surface 12, in that the light-receiving surface 14 and the light-emitting surface 12 are both portions of a common surface.

Figure 3:
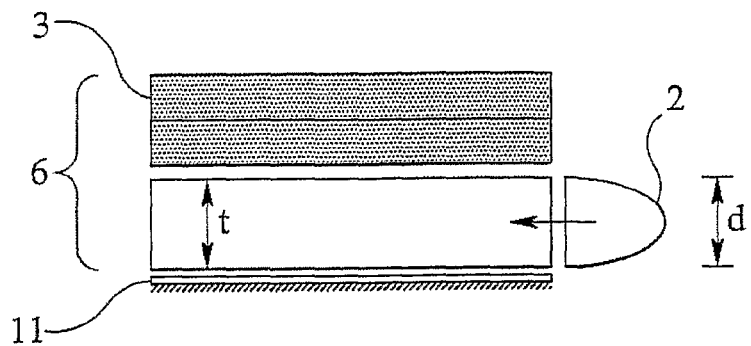
FIG. 3 illustrates a problem with a backlight having the general form shown in FIG. 1(a)

The provision of the light-reflecting surface 15 means that light is not required to enter the waveguide substantially along the long axis of the waveguide as in the prior art light-guide of FIG. 3. This in turn means that the light-receiving surface 14 is not required to extend across the thickness direction of the light-guide 1, between the surface 12 for light emission and the back surface 13. As is shown in FIG. 6, the light source 2 may be so placed and so oriented, and the light reflecting surface may be so shaped, that light enters the light-guide 1 at substantially 90° to the long axis of the waveguide, and is reflected by the reflecting surface 15 so as to propagate generally along the long axis of the waveguide 1.

In the illumination system shown in FIG. 6, therefore, the thickness t of the light-guide 1, measured between the surface 12 for light emission and the back-surface 13 of the light-guide, is not constrained to be equal to or greater than, the diameter d (or other appropriate dimension) of the light source 2. It is only necessary that the dimensions of the light-receiving surface 14 of the light-guide 1 are made equal to or greater than the diameter d of the light source 2. However, since the light-receiving surface 14 does not extend in the thickness direction of the light-guide, this does not place any constraint on the thickness t of the light-guide. Thus, even if the diameter d of the light-source 2 of FIG. 6 is equal to the diameter d of the light-source of FIG. 3, it is possible for the thickness t of the light-guide 1 of FIG. 6 to be substantially less then the thickness t of the light-guide 1 of FIG. 3. Comparison of the display of FIG. 3 and the display of FIG. 6 shows that, even though the same light source (LED) and the same display device are used, the display of FIG. 6 has a significantly reduced overall thickness compared to the display of FIG. 3. The thickness of the light-guide in the illumination system shown in FIG. 6 may, in principle, be made as small as possible commensurate with the light-guide remaining sufficiently robust to withstand any shocks that it is likely to encounter in use.

According to the invention, the thickness t of the light-guide 1 may be reduced to 0.3 mm or below, or even to 0.2 mm or below, even if a light-source having a diameter d of 0.6 mm or 0.8 mm is used. In contrast, in the conventional display 6 of FIG. 3, use of a light-source with a diameter d of 0.8 mm or 0.6 mm would require that the thickness t of the light-guide 1 is at least 0.8 mm or 0.6 mm respectively.

It is preferable that the height by which the light source 2 projects above the light-guide 1 is not greater than the overall distance D between the light-emission surface 12 of the light-guide 1 and the upper surface of the display device 3. The distance by which the light-source 2 projects above the light-guide is given by l+g where l is the length of the light-source and g is the gap between the light-emitting surface of the light-source and the light-receiving surface 14 (shown in FIG. 7). It is therefore preferable, firstly, to minimise the distance g between the light-emitting surface of the light-source 2 and the light-receiving surface 14 of the light-guide, by placing the light source on or very close to the light-receiving surface 14. Once the gap g has been reduced to its smallest possible value, the length l of the light-source is then preferably chosen such that (l+g)<D. Depending on the thickness of the display device 3, this may possibly require that the length l of the light-source 2 of FIG. 6 is made less then the length of the light-source 2 of the known display of FIG. 3—however, a limit on the length of the light source is unlikely to present any serious problems in manufacture or use. In particular, in the case where the light-source 2 is an LED package, the length of an LED package generally determines the degree of collimation of light emitted by the LED package. Reducing the length of an LED package will reduce the degree of collimation of the light output from the LED package, but a reduced collimation is not so much of a problem in a backlight of the invention as in the prior art because, in a backlight of the invention, light is not directed into a thin edge of a waveguide but is directed into a surface of the waveguide. Indeed, a lower degree of collimation will mean that there is less interaction of light from the light-emitting element of the LED package with the package walls. As a result the LED package should be slightly brighter, and, since less light is absorbed in the package resin, the lifetime of the LED package should be improved. In contrast, reducing the diameter d of an LED package, as would be required to reduce the thickness t of the light-guide 1 in the conventional display 6 of FIG. 3, can severely reduce the lifetime and power output of an LED package.

The first part of the light-guide, defined by the light-emission surface 12 and the back surface 13 of the light-guide, and the second part of the light-guide 1, defined by the light-receiving surface 14 and the light-reflecting surface 15, together constitute an optically continuous refractive medium. This may conveniently be achieved by forming the light-guide as a single unit, so that the first part of the light-guide and the second part of the light-guide are integral with one another. The light-guide 1 of FIG. 6 may, for example, be moulded from a suitable transparent plastics material or transparent resin, using a suitably shaped mould.

In principle, however, the first part of the light-guide and the second part of the light-guide may be manufactured as separate components, and attached to one another to form the light-guide. If this is done, the refractive index of the first part of the light-guide should be equal or approximately equal to the refractive index of the second part of the light-guide, and they should be joined using a transparent adhesive that has a refractive index that is approximately equal to the refractive index of both parts of the light-guide—so that the two parts of the light-guide and the transparent adhesive constitute a substantially optically continuous refractive medium.

Figure 4:
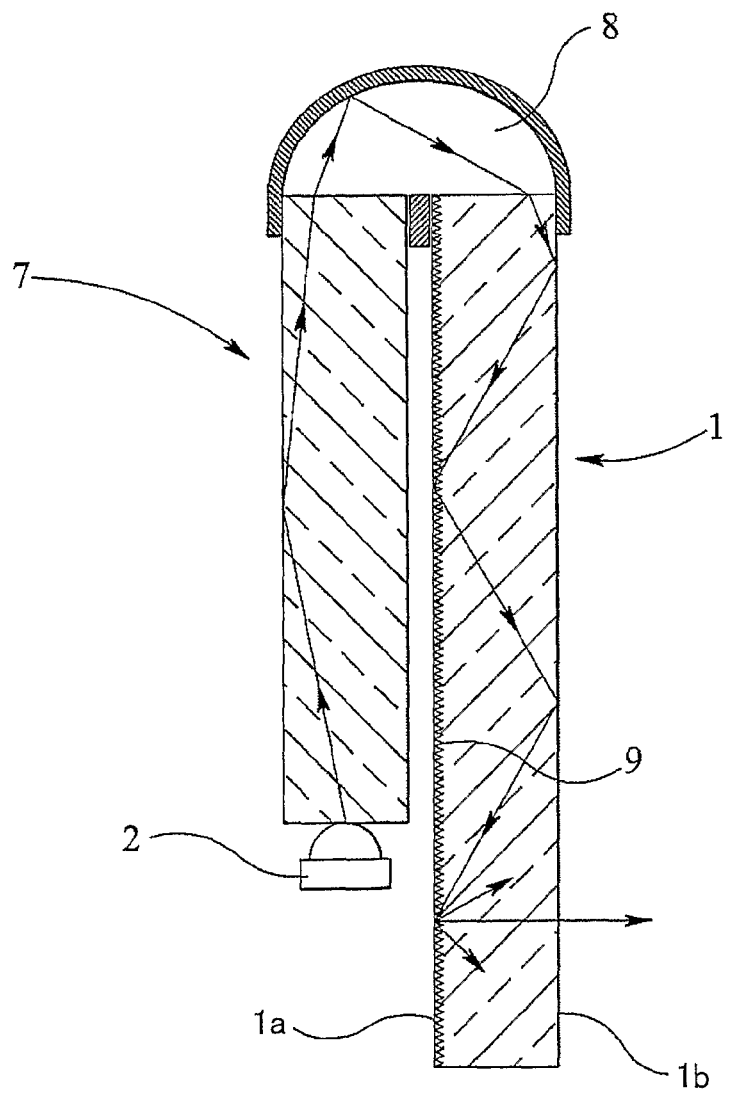
FIG. 4 is a schematic sectional view of a backlight having a light-transition section.
Figure 5A:
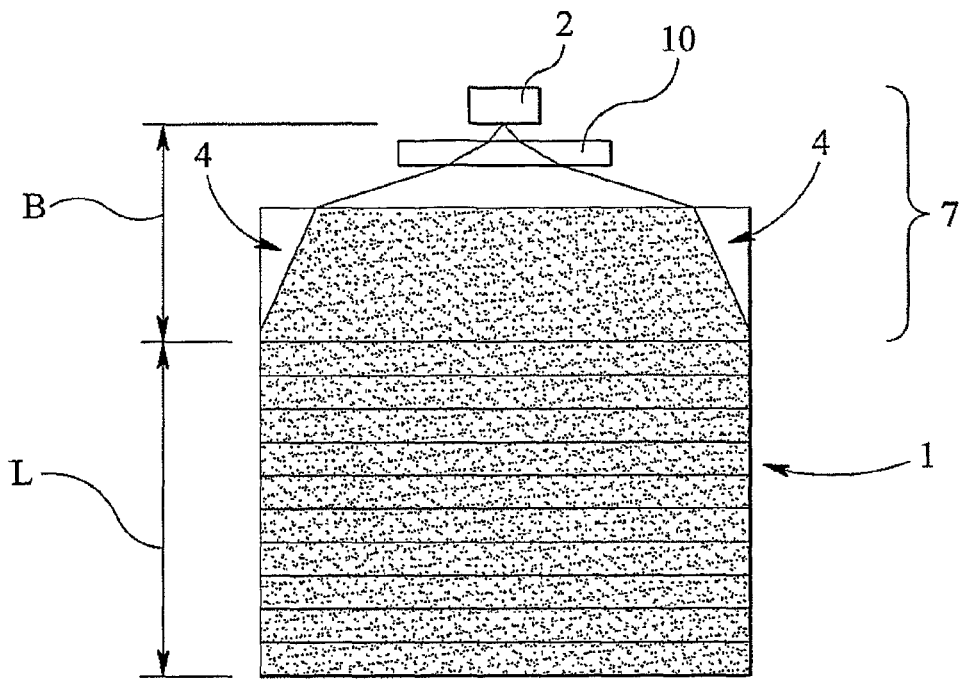
FIG. 5(a) is a plan view of a further backlight having a light-transition section.
Figure 5B:
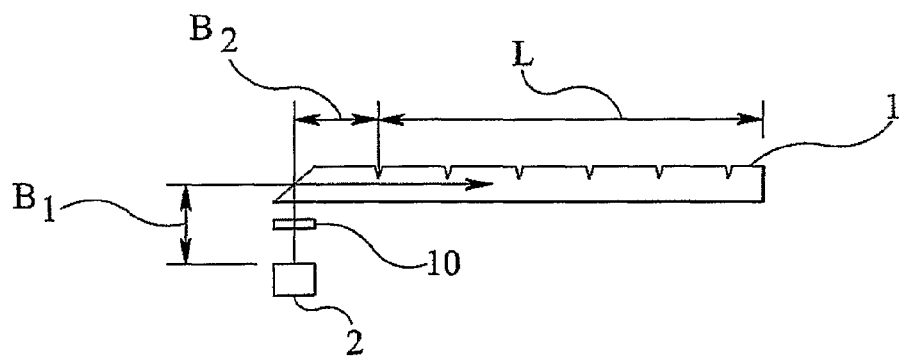
FIG. 5(b) is a side view of a further backlight having a light-transmission section.

The light-reflecting surface 15 of the light-guide acts as an optical turning element for re-directing the light that has entered the light-guide 1 through the light-receiving surface 14 so as to be directed substantially along the light-guide. The light-reflecting surface 15 can reflect light with little loss of light. This is because light entering the light-guide of a back-light of the invention undergoes a single reflection in principle from a single surface, whereas the backlight of FIG. 4 requires the light to turn by multiple reflections. In the prior art light-guide of FIG. 4, substantial optical loss will occur as a result of multiple reflections from a lossy reflector or bending loss from TIR in a curved waveguide.

A reflective layer 16 is preferably disposed over the light-reflecting surface 15 of the waveguide, to improve the efficiently with which light is reflected into the first part of the waveguide. The reflective layer 16 may, for example, be a metallic layer deposited over the light-reflecting surface 15 as shown in FIG. 7. Alternatively, it is likely that a practical implementation of the display 6 of FIG. 6 will in practice include a reflector that, similar to the reflector 11 of FIG. 3, is positioned behind the light-guide 1 in order to recycle light that is emitted from the back face 13 of the light-guide. It would be possible for this reflector to extend over the entire area of the back surface of the light-guide 1, including over the light-reflecting surface 15, and for this reflector to be shaped complementary to the shape of the back of the surface light-guide 1.

The light-reflecting surface 15 of the light-guide is preferably shaped so as to direct light from the light-source 2 into the first part of the waveguide 1 with low loss. Using a simple etendue argument it is possible to show that, for a typical 0.6 mm thick LED package (having an open aperture for light emission with a diameter of approximately 0.45 mm), a refractive index for the light-guide 1 of 1.5, and a typical in-coupling efficiency of 0.7 for coupling light into the light-guide, a minimum light-guide thickness t of $0.7 \times 0.45/1.5 = 0.21$ mm may be used (assuming similar numerical apertures for the light-guide and the LED package, and assuming that the emission angle of the LED package is approximately similar to the range of angles of the light in a fully TIR waveguide (which is a good approximation in general)). As explained above, this is approximately ⅓ of the thickness of light-guides commonly in use today.

In principle, the light-reflecting surface 15 could be a planar surface. However, a planar light-reflecting surface would be likely to result in a low light capture efficiency. It is therefore preferable that the light-reflecting surface 15 is non-planar and, preferably, is convex in cross-section as shown in FIG. 6.

Although the illumination system of FIG. 6 is shown as having only one light source, the embodiment is not limited to this. The illumination system shown in FIG. 6 may alternatively include two or more light sources, with each light source disposed adjacent or substantially adjacent to the light receiving surface (for example in the manner shown in FIG. 12). The use of two or more light sources provides an illumination system with a higher output light intensity, compared to an illumination system having only one light source. It may also provide an output light intensity that is more uniform over the area of the surface for light emission.

One suitable shape for the light-reflecting surface of a light-guide 1 having the general form show in FIG. 6 and a thickness of 0.2 mm, when illuminated by a LED package having a diameter d of 0.6 mm, is shown in FIG. 7. The light-emitting aperture of the LED package in this case is 0.48 mm. Defining the origin at the top edge of the aperture of the LED package and level with the upper surface of the light-guide 1, it is possible to define three points:
the origin O;
a point P on the lower surface of the light-guide on the other side of the LED (with coordinates x 0.2, y=0.48); and
an intermediate point Q.

The intermediate point Q is determined from a curve given by $y=0.48*(x/0.2)^{1.35}$, and the best result is found when x=0.1 giving y=0.19.

The shape of the light-reflecting surface 15, may, for example, be defined by a quadratic curve between O and P. It would be possible to determine a quadratic curve that passes through points O, Q and P, since 3 non-collinear points define a quadratic curve. It is, however, possible to reduce the number of parameters by defining the shape of the light-reflecting surface 15 to be a quadratic rational Bezier curve. It is possible to generate a family of quadratic curves that pass through point O and point P, using point Q as a control. The light-receiving surface 15 shown in FIG. 7 corresponds to an intermediate weighting of 2.

A simulation of the light-guide of FIG. 7, assuming a reflectivity for the light-reflecting surface 15 of 97%, and using a standard model LED package having a blue LED element surrounded by a yellow phosphor, gave the efficiency of light captured into the first part of the light-guide of 64%. This simulation was for a single LED.

Figure 12:
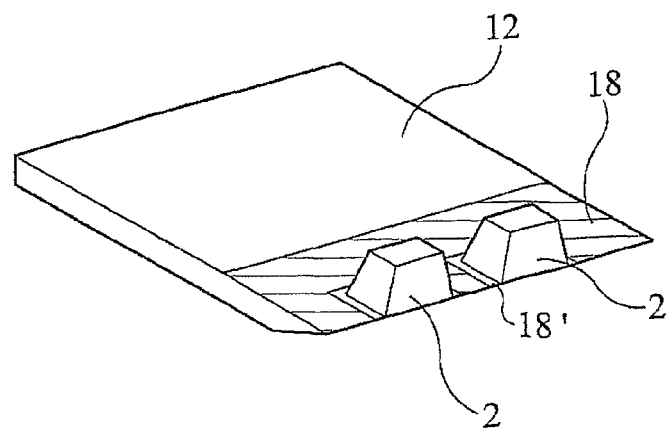
FIG. 12 is a schematic perspective view of an illumination system according to a further embodiment of the present invention.

The efficiency of light capture into the first part of the light-guide may be increased by providing a reflector over a part or parts of the light-receiving surface 14 of the light guide where no light source is provided. This is illustrated in FIG. 12, which is schematic perspective view of an illumination system according to this embodiment, and shows reflective material 18 provided on the light-receiving surface 14 of the light-guide, on parts of the light-receiving surface 14 where no light source is provided. If any light that enters the light-guide should be reflected by the light-reflecting surface 15 such that it would pass back out of the light-guide through the light-receiving surface 14 and be lost, the reflective material 18 will reflect the light back into the light-guide so that the light is re-cycled and is not lost. The reflective material 18 may, for example, be a thin metallic layer, and preferably covers as great an area as possible of the parts of the light-receiving surface 14 where no light source is provided, to minimise the loss of light. (In FIG. 12, the reflective material 18 is shown as disposed over the entire exposed area of the light-receiving surface, apart from a narrow strip 18' around each light source 2, but the invention is not limited to this particular arrangement.) In a simulation in which a number of LED packages were disposed along one edge of the light-guide, it was found that providing the reflective material 18 between the LED packages raised the light capture efficiency to 68%.

The embodiment of FIG. 12 may be made by depositing a thin metallic layer over the light receiving surface 14, and then removing the metallic layer (for example by etching) from locations where it is intended to provide a light source. An insulating layer (not shown) may be provided over the reflector to prevent electrical connections to a display placed over the light-emitting surface 12 of the light-guide from touching the reflective material 18.

The shape of the light-reflecting surface is important, and should be chosen to obtain a good light capture efficiency into the first part of the light-guide. The shape of the light-reflecting surface is not limited to a quadratic curve, but could alternatively be, for example, a higher order polynomial curve, and exponential curve, or a hyperbolic curve.

As further alternative, the shape of the light-reflecting surface may comprise a series of straight line portions that approximates one of the shapes described above.

In FIGS. 6 and 7 the light-receiving surface 14 of the light-guide 1 is shown as flat. As is known in the art, however, it would be possible to provide the light-receiving surface 14 with an input or mixing structure that increases the divergence of light entering the second part of the waveguide. If an input or mixing structure is provided it should be optically continuous with the light-guide 1 and may be formed integrally on the light-receiving surface 14 of the light-guide 1. Such input/mixing structures may be conventional, and will not be described here.

In FIG. 6, components of the display not necessary for understanding the invention have been omitted for clarity of explanation, and a practical display will contain additional components to those shown in FIG. 6. For example, a typical display package is likely to contain a diffuser placed between the light-emission surface 12 of the light-guide and the display device 3, to eliminate any non-uniformity of illumination over the area of the display device. As a further example, one or more brightness enhancing films are also likely to be provided between the light-emission surface 12 of the light-guide and the display device 3. As a yet further example, drive circuitry for driving the display device to display an image will also be provided. These components may be conventional, and they will not be described here in detail.

The light-emission surface 12 of the light-guide 1 of FIG. 6 may be flat (planar), for example if the display device 3 has a planar input face. Alternatively, if the display device 3 is non-planar—for example if the display device 3 has a curved input face—the light-emission surface 12 of the light-guide 1 may be shaped so as to be complementary to the shape of the display device 3 or of the input face of the display device 3. It should be noted, however, that a curved display device typically has a radius of curvature of at least 20 cm, and a light-emission surface shaped to be complementary to such a display device may be considered as substantially flat.

FIG. 8(*a*) shows a display 6 incorporating an illumination system according to a further embodiment of the present invention. The illumination system of FIG. 8(*a*) corresponds generally to the illumination system of FIG. 6, and only the differences will be described here.

Figure 8A:
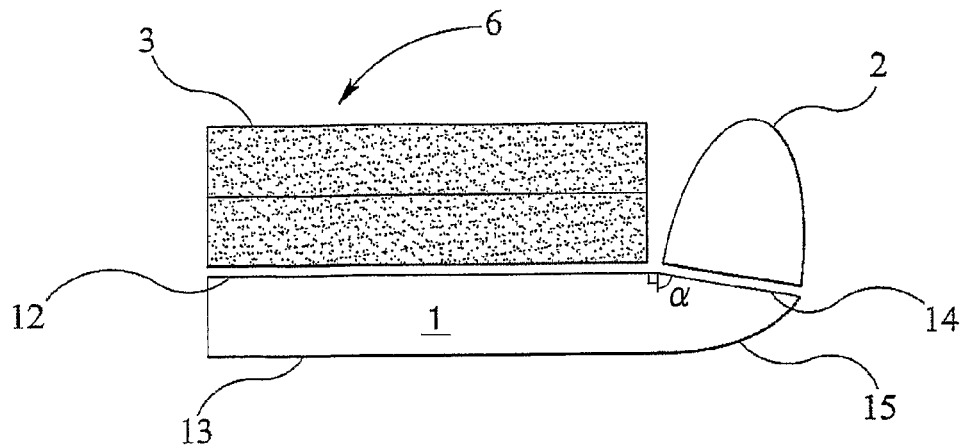
FIG. 8(a) is a schematic view of a display device having an illumination system according to a further embodiment of the present invention.

In the illumination system of FIG. 8(a), the light-emission surface of the light-guide 1 is inclined with respect to the light-emission surface 12 of the light-guide. In this embodiment, the light-receiving surface is inclined away from the light-emission surface in that the angle between the light-emission surface 12 and the light-receiving surface 14, on the outside of the light-guide 1, is greater than 180°. This embodiment has the advantage that the angle through which light from the light source 2 must be reflected is smaller than the angle through which light must be reflected in the illumination system of FIG. 6. A further advantage of this embodiment is that, for a given display device 3, a light source having a greater height h may be accommodated in the display of FIG. 8(a) than in the display of FIG. 6. Ignoring the gap between the display device 3 and the light-guide 1, and ignoring the gap between the light-source 2 and the light-guide 1, the maximum height of light-source that can be accommodated in the illumination system of FIG. 8(a) is given by $h_{max}=T/\cos(90-\alpha)$, where T is the thickness of the display device and $\alpha$ is the angle between the light-receiving surface 14 and the normal to the light-emission surface 12.

Figure 8B:
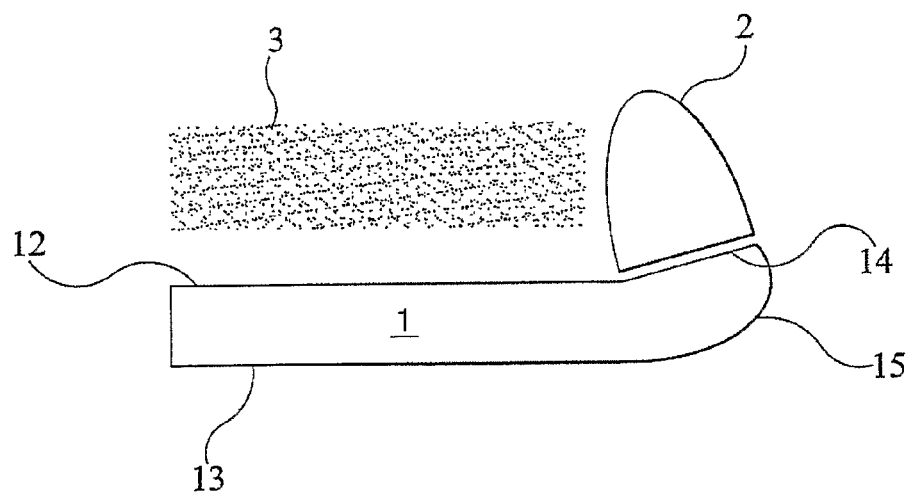
FIG. 8(b) is a schematic view of a display device having an illumination system according to a further embodiment of the present invention.

FIG. 8(b) shows a display incorporating an illumination system according to a further embodiment of the present invention. The illumination system of FIG. 8(b) corresponds generally to the illumination system of FIG. 6, and only the differences will be described here.

In the embodiment of FIG. 8(b), the light-receiving surface 14 of the light-guide 1 is again inclined with respect to the light-emission surface 12 of the waveguide. In this embodiment, the light-receiving surface 14 is tilted towards the light-emission surface 12, in that the angle between the light-emission surface 12 and the light-receiving surface 14, measured on the outside of the waveguide, is less than 180°.

This embodiment may again provide an improved capture efficiency, provided that the shape of the light-reflecting surface 15 is chosen appropriately. In this embodiment, however, for a given display device 3, the maximum height of the light-source that can be accommodated, without the light-source protruding beyond the display device 3, is less in the illumination system of FIG. 8(b) than in an illumination system of FIG. 6.

In the embodiments of FIGS. 8(a) and 8(b) it is preferable that the light-reflecting surface is non-planar, as shown in the figures, to improve the light-capture efficiency as explained above.

Figure 9:
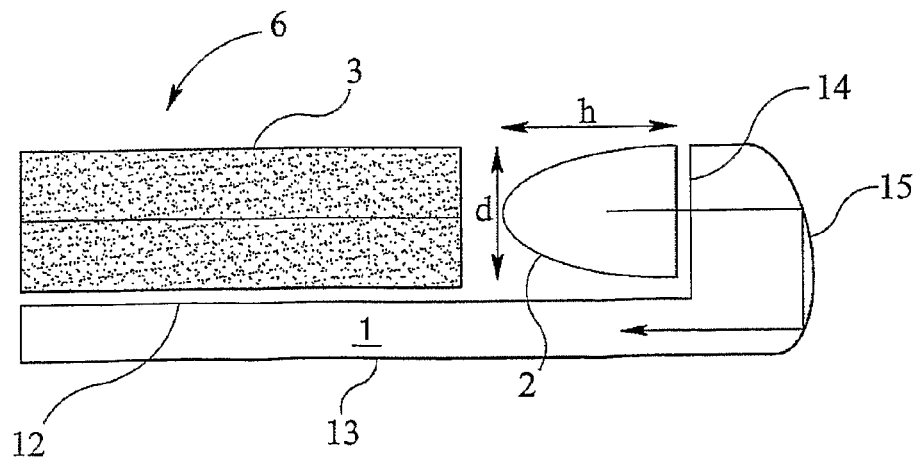
FIG. 9 is a schematic view of a display device having an illumination system according to a further embodiment of the present invention.

FIG. 9 shows a display incorporating an illumination system according to a further embodiment of the present invention. The illumination system of this embodiment corresponds generally to the illumination system of FIG. 6 and only the differences will be described.

In this embodiment, the light-receiving surface 14 is perpendicular or substantially perpendicular to the light-emission surface 12 of the light-guide 1, so that the light-receiving surface 14 is on the same side of the light-guide as the display device 3. In this embodiment, the light-reflecting surface 15 is required to reflect the light from the light-source 2 through an angle of approximately 180° in order to direct it into the first part of the light-guide.

In this embodiment, there is effectively no restriction on the height h of the light-source 2. The principal requirement of the light-source is that the diameter d of the light-source is less then the thickness of display device 3. For a typical display device, it is possible to use a conventional light source having a diameter d of 0.8 or 0.6 mm in the embodiment of FIG. 9, without the diameter of the light-source exceeding the thickness of the display device. The diameter d of the light source may, as shown in FIG. 9, be greater than the thickness of the first part of the waveguide defined between the light-emission surface 12 and the back surface 13.

The first part of the light-guide of FIGS. 6, 8(a), 8(b) and 9 is shown as having a uniform thickness t. In principle, the first part of the light-guide could be tapered, so that its thickness t reduces across the light-guide. This may however be undesirable in practice, since the thickness of the display would be determined by the maximum thickness of the light-guide.

Figure 10:
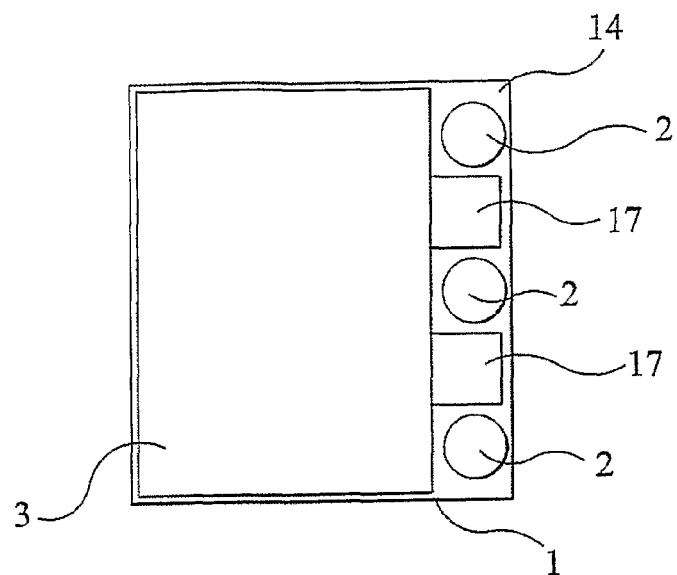
FIG. 10 is a schematic plan view of a display device having an illumination system according to a further embodiment of the present invention.

The embodiment described above may be varied in many ways. For example FIGS. 6, 8(a), 8(b) and 9 each shows an illumination system having a single light-source 2, but an illumination system of the invention is not limited to a single light source. It would, for example, be possible to provide two or more light sources arranged along one edge of the light-guide 1, with each light-source being disposed adjacent, or nearly adjacent, to the light-receiving surface 14 of the light-guide. FIG. 10 is a plan view of a display in which a plurality of light sources (3 light sources are shown in FIG. 10, but this embodiment is not limited to three light sources) are arranged along one edge of the light-guide 1, with each light-source being disposed adjacent, or nearly adjacent, to the light-receiving surface 14 of the light-guide.

FIG. 10 illustrates how the drive circuitry 17 for the display device 3 may be arranged between adjacent light sources.

Figure 11:
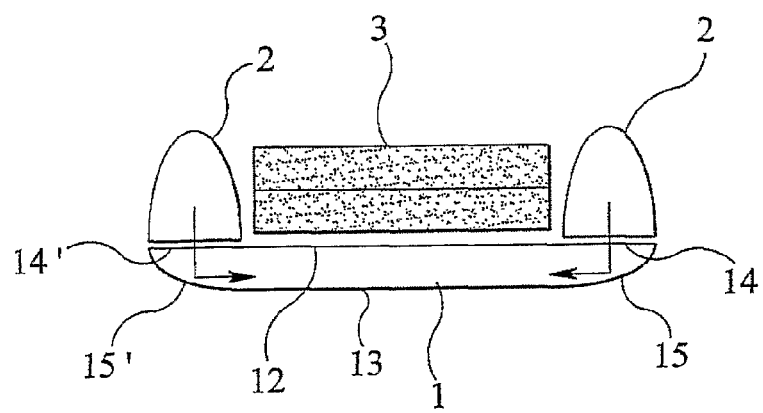
FIG. 11 is a schematic view of a display device having an illumination system according to a further embodiment of the present invention.

A further example, the light-guide of an illumination system of the invention may comprise two or more light-receiving surfaces 14, 14'. FIG. 11 is a schematic sectional view of a display having an illumination system in which the light-guide 1 has two light-receiving surfaces 14, 14', in this example arranged along opposite side edges of the light-guide. In the illumination system shown in FIG. 11, the second light-receiving surface 14' and a second light-reflecting surface 15' define a third part of the light-guide 1 that forms an optically continuous refractive medium with the first and second parts of the light-guide 1. Again, the waveguide may be formed as a single component, for example by moulding, so that the first, second and third parts of the waveguide are integral with one another. Alternatively, the first, second and third parts of the waveguide may be manufactured separately, and assembled to form the waveguide.

A second light source 2 is disposed adjacent or substantially adjacent to the second light-receiving surface 14' of the light-guide. Light entering the third part of the waveguide through the second light-receiving surface 14' is directed into the first part of the waveguide by the second light reflecting surface 15'. The arrangement of the second light source 2, the second light-receiving surface 14' and the second light reflecting surface 15' corresponds to the arrangement of the first light source 2, the first light-receiving surface 14 and the first light reflecting surface 15 as described hereinabove. Reflectors (not shown) may be disposed over each of the first and second light-reflecting surfaces 15,15', as described above with reference to FIG. 7. Moreover, reflectors (not shown) may be disposed over at least a part of each of the first and second light-receiving surfaces 14,14' where no light source is provided, as described above with reference to FIG. 12.

The use of two or more light sources provides an illumination system with a higher output light intensity, compared to an illumination system having only one light source. It may also provide an output light intensity that is more uniform over the area of the surface for light emission.

In an embodiment of the invention in which the illumination system has a waveguide with two light-receiving surfaces, the illumination system may comprise two or more light sources provided adjacent or nearly adjacent to the first light-receiving surface 14 and two or more further light-sources provided adjacent or nearly adjacent to the second light-receiving surface 14'. In one embodiment, the illumination system may contain 4 light sources, one disposed at or near each corner of the light-guide.

In the illumination systems shown in FIGS. 6, 8(*a*), 8(*b*), 9, 10 and 11, LED packages have been used as the or each light source. The invention is not, however, limited to the use of an LED package as the or each light source. Other suitable light-sources may be used such as, for example, florescent tubes or cold cathode florescent lights.

Prism spreaders may be incorporated into the light-reflecting surface 15, and, in the illumination system of FIG. 11, into the second light-reflecting surface 15'. These are known in the art, and will not be described further.

Figure 13A:
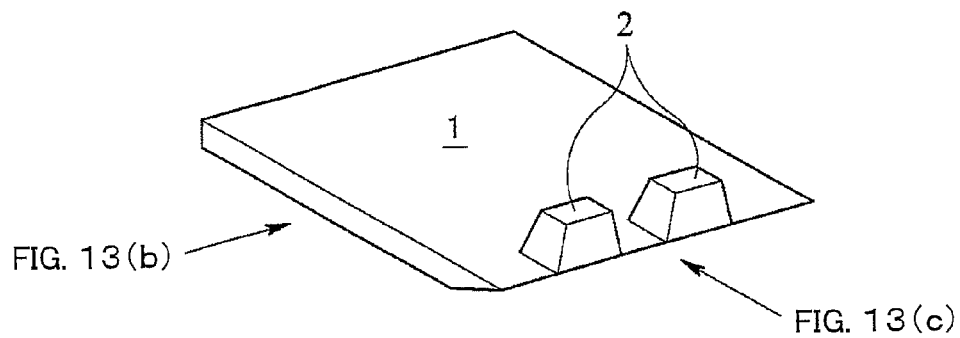
FIGS. 13(a) to 13(c) are schematic views of an illumination system according to a further embodiment of the present invention.
Figure 13B:
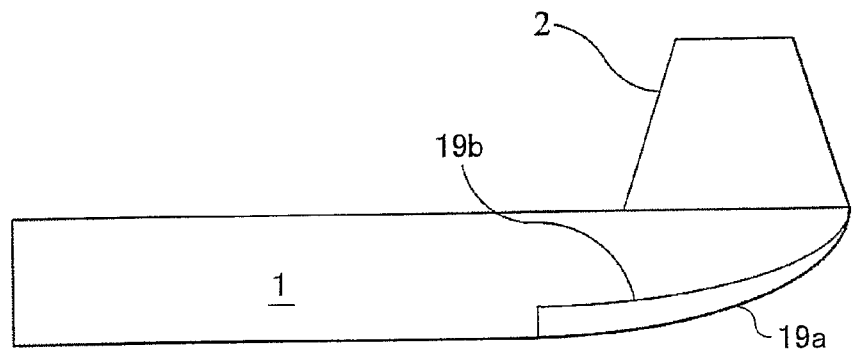
Figure 13C:
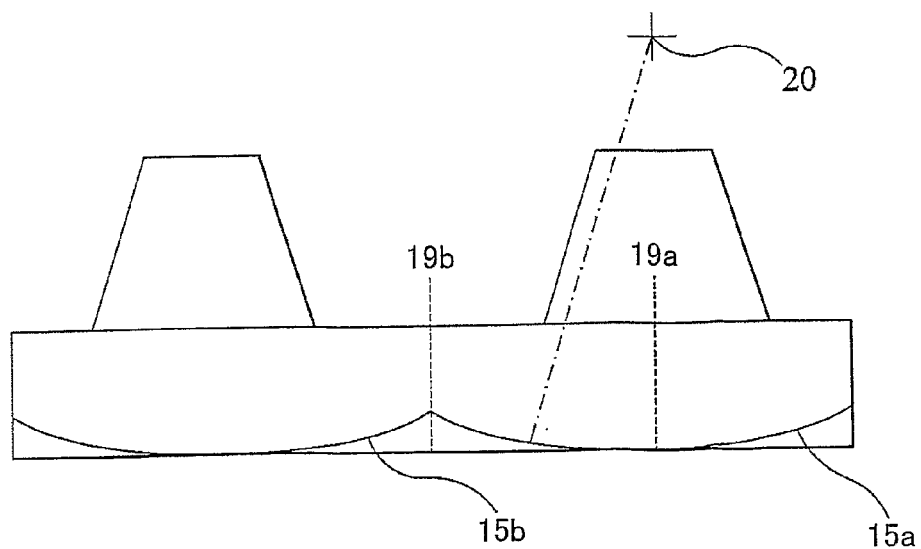

In the embodiments described above, the second part of the light-guide has a uniform cross-section across the breadth of the waveguide, so that the light-reflecting surface 15 is curved only in (at most) one dimension. The invention is not limited to this, however, and the cross-section of the second part of the light-guide may vary across the second part of the light guide so that the light-reflecting surface 15 is curved in two dimensions. In particular, the light-reflecting surface 15 may have a profile that varies across the breadth of the light-guide. FIGS. 13(*a*), 13(*b*) and 13(*c*) are, respectively, a schematic perspective view, a side view and a front view of an illumination system according to such an embodiment of the invention.

In FIG. 13(*b*), curve 19*a* represents the profile of the light reflecting surface 15 of the light-guide under the centre of a light source 2—the broken line labelled 19*a* in FIG. 13(*c*) denotes a position at which the light reflecting surface 15 has the profile of curve 19*a*. The curve 19*a* preferably corresponds to one of the curves described above with reference to FIG. 7.

The profile of the light reflecting surface 15 of the light-guide at a location substantially intermediate between two light sources is denoted by the curve 19*b* in FIG. 13(*b*)—the broken line labelled 19*b* in FIG. 13(*c*) denotes a position at which the light reflecting surface 15 has the profile of curve 19*b*. It can be seen that the curve 19*a* is not the same as the curve 19*b*—the profile of the light-reflecting surface 15 varies over the breadth of the waveguide. In this embodiment, the profile of the light-reflecting surface 15 varies along the breadth of the light-guide—that is, where two or more light sources are arranged along the breadth of the light-guide as shown in FIG. 13(*a*), the profile of the light-reflecting surface 15 varies along the direction in which the light sources 2 are arranged. The light-reflecting surface 15 is curved as seen in section along the breadth direction.

Preferably, the light-reflecting surface 15 comprises one or more segments, with the cross-section through the or each segment along the breadth of the light-guide having a curved profile. Preferably, the or each light source 2 is disposed above a corresponding segment. This is shown in FIG. 13(*c*), which shows the light-reflecting surface formed as two segments 15*a*, 15*b*. One light source 2 is disposed above one segment 15*a* of the light-reflecting surface, and another light source 2 is disposed above another segment 15*b*. (Only two light sources 2 and two segments 15*a*, 15*b* of the light-reflecting surface are shown in FIG. 13(*c*), but the invention is not limited to this, and the light-reflecting surface may comprise one segment or more than two segments. Preferably, the number of light sources is equal to the number of segments of the light-reflecting surface, with each light source being disposed above a corresponding segment of the light-reflecting surface.)

The or each segment of the light-reflecting surface may be a portion of the surface of a solid of revolution. This is shown in FIG. 13(*c*), in which each segment of the light-reflecting surface is generated by rotating the curve 19*a* about a respective axis 20 that extends along the length of the light guide, perpendicular to the direction along which the light sources 2 are arranged. In FIG. 13(*c*) the axis 20 is on the opposite side of the light-guide to the light-reflecting surface, so that the segment of the light-receiving surface is convex when seen in section parallel to the direction along which the light sources 2 are arranged. Preferably the axis 20 is aligned with the centre of the respective light source.

Figure 14A:
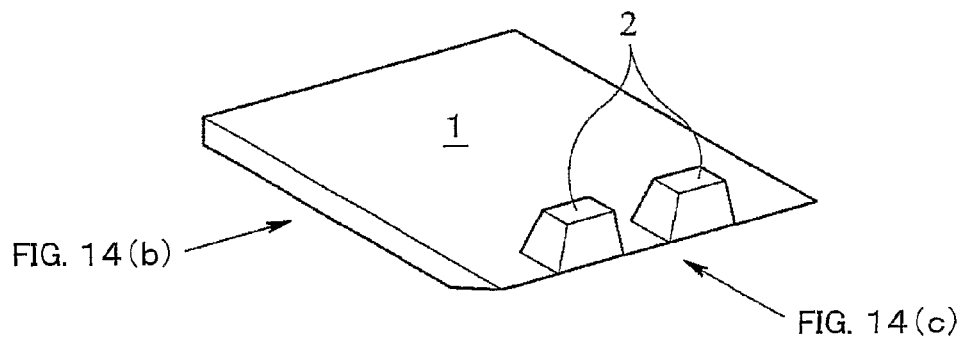
FIGS. 14(a) to 14(c) are schematic views of an illumination system according to a further embodiment of the present invention and FIG. 15 is a schematic sectional view of a reflective display device incorporating an illumination system of the present invention.
Figure 14B:
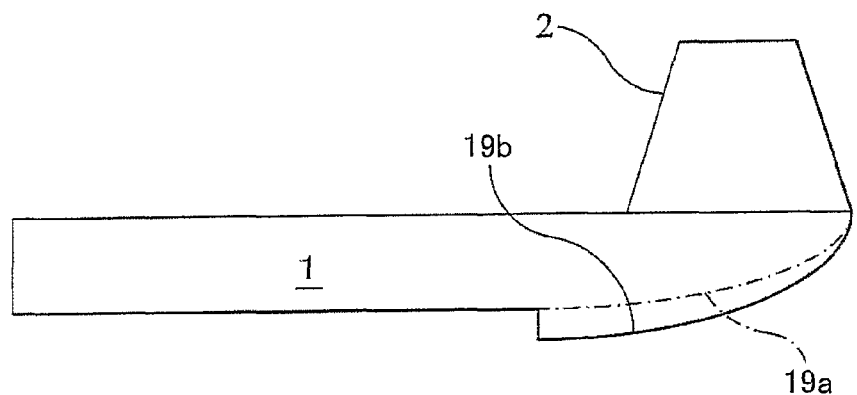
Figure 14C:
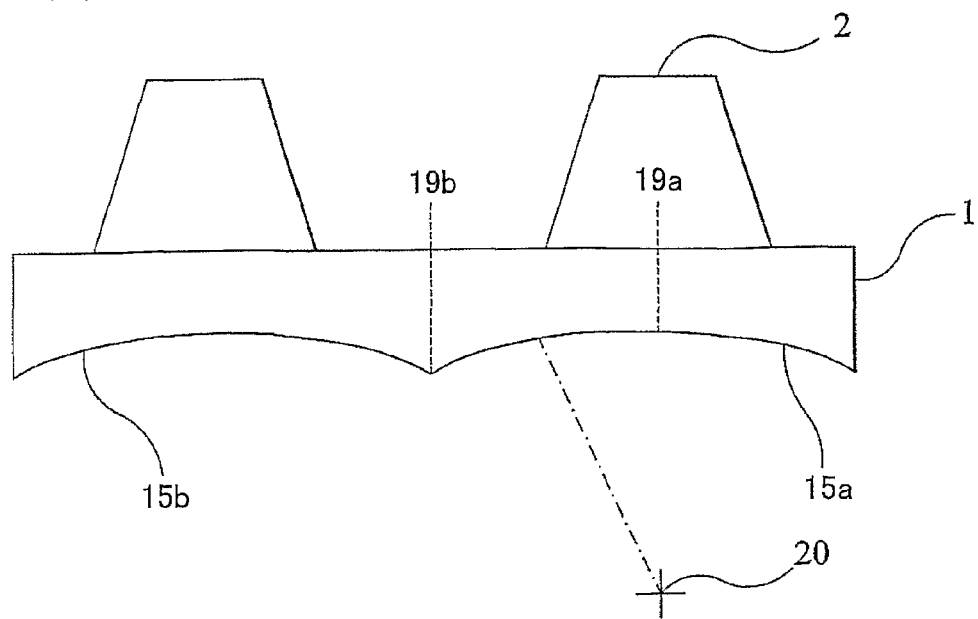

FIGS. 14(*a*), 14(*b*) and 14(*c*) are, respectively, a schematic perspective view, a side view and a front view of an illumination system according to a further embodiment of the invention. This embodiment corresponds generally to the embodiment of FIGS. 13(*a*), 13(*b*) and 13(*c*), and only the differences will be described.

In FIG. 14(*c*) the axis 20, about which a segment 15*a*, 15*b* of the light-reflecting surface is generated, is on the same side of the light-guide as the light-reflecting surface, rather than on the opposite side of the light-guide to the light-reflecting surface as in FIG. 13(*c*). Thus, a segment of the light-receiving surface 15 is concave when seen in section parallel to the direction along which the light sources 2 are arranged.

In the embodiments of FIGS. 13(*a*) to 13(*c*) and 14(*a*) to 14(*c*) the axis 20 may be, but is not required to be, parallel to the light-guide 1. The axis 20 may alternatively be within, or pass through, the light guide.

In an embodiment in which the light reflective surface is shaped such that a cross-section through the light reflective surface along the breadth of the light-guide has a curved profile, or in which the light reflective surface is formed of two or more segments such that a cross-section through the or each segment along the breadth of the light-guide has a curved profile, the light reflective surface, or the segments of the light-reflective surface, are not limited to portions of a solid of revolution. The light reflective surface, or the segments of the light-reflective surface, may have any suitable shape such as, for example, a conic shape (such as elliptical, parabolic etc).

In the embodiments of the FIGS. 13(*a*) to 14(*c*), forming the light-reflecting surface 15 as one or more segments of a solid of revolution will improve light divergence in the light-guide, and will also improve in-coupling efficiency into the first part of the light-guide for high angle rays.

In the embodiments of FIGS. 13(*a*) to 14(*c*), or in other embodiments in which the light reflective surface is shaped such that a cross-section through the light reflective surface, or a segment thereof, along the breadth of the light-guide has a curved profile, the light-reflecting surface may alternatively comprise a series of planar portions that approximates one of the shapes described.

In the embodiment of FIG. 11, each light reflecting surface 15*a*, 15*b* may be shaped as described above, for example according to FIGS. 13(*a*)-13(*c*) or according to FIGS. 14(*a*)-14(*c*).

Figure 15:
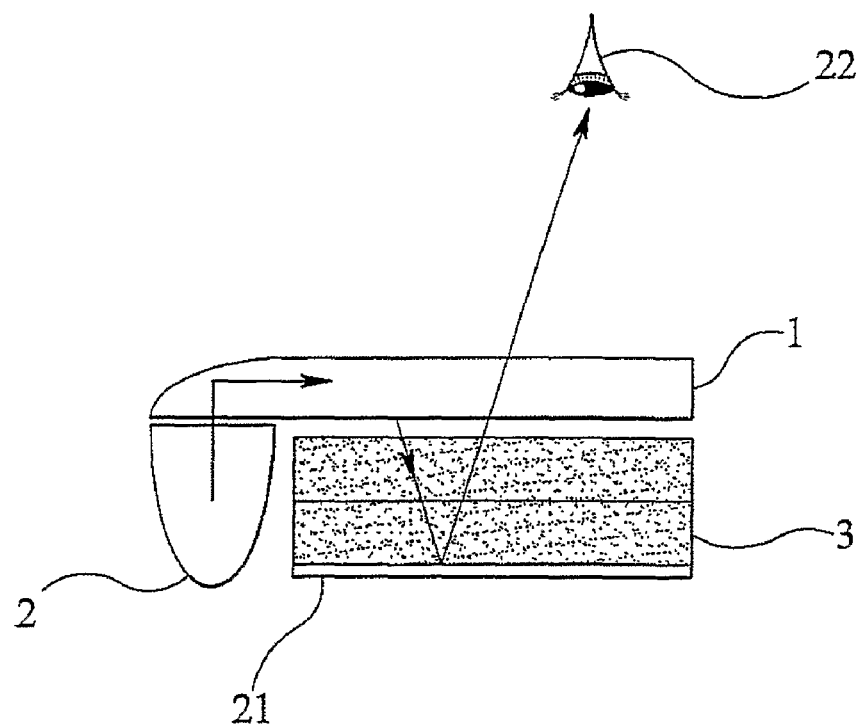

In the embodiments described above, the illumination system of the invention has been used as backlight for a transparent display device, with the illumination system disposed on the opposite side of the display device to an intended viewing position of the display device (as shown, for example, in FIG. 6). An illumination system of the invention is not, however, limited to use as a backlight and may, for example, alternatively be used as a frontlight for a reflective or transflective display. In such an application, illustrated schematically in FIG. 15, an illumination system of the invention is disposed on the same side of the display device 3 as an intended viewing position 22 of the display device. Light is emitted from the light-guide 1 of the illumination system into the display device 3, and is reflected back through the light-guide to an observer, for example by a reflector indicated at 21.

In the embodiments described above, the or each light source is preferably arranged to emit light perpendicular or substantially perpendicular to the respective light receiving surface. This increases the efficiency of coupling light into the waveguide, by minimising the reflection of light at the light receiving surface(s).

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

The invention claimed is:

1. An illumination system comprising a light source and a light-guide;
   wherein a first part of the light-guide is defined by a surface for light emission and a back surface generally opposed to the surface for light emission, and a second part of the light-guide is defined by a light receiving surface and a light reflecting surface, the light reflecting surface being for reflecting light entering the second part of the light-guide through the light receiving surface into the first part of the light-guide;
   wherein the first part of the light-guide and the second part of the light-guide define an optically continuous refractive medium;
   wherein the surface for light emission, the light receiving surface, the light reflecting surface and the back surface are non-coincident with one another;
   wherein the light source is disposed adjacent or substantially adjacent to the light receiving surface of the light-guide; and
   wherein the light source and the light receiving surface are on the same side of the waveguide as the surface for light emission.

2. An illumination system as claimed in claim 1 wherein the surface for light emission is flat or substantially flat.

3. An illumination system as claimed in claim 1 wherein the light emission surface is continuous or substantially continuous with the light receiving surface.

4. An illumination system as claimed in claim 1 wherein the light emission surface is inclined with respect to the light receiving surface.

5. An illumination system as claimed in claim 4 wherein the light emission surface is inclined away from the light receiving surface.

6. An illumination system as claimed in claim 4 wherein the light emission surface is inclined towards the light receiving surface.

7. An illumination system as claimed in claim 1 wherein the light emission surface is substantially perpendicular to the light receiving surface.

8. An illumination system as claimed in claim 1 wherein the first part of the waveguide is integral with the second part of waveguide.

9. An illumination system as claimed in claim 1 wherein the light reflecting surface is non-planar.

10. An illumination system as claimed in claim 9 wherein the light reflecting surface is convex in cross-section.

11. An illumination system as claimed in claim 10 wherein the light reflecting surface is defined by a polynomial, exponential, or hyperbolic curve.

12. An illumination system as claimed in claim 11 wherein the light reflecting surface is defined by a quadratic curve.

13. An illumination system as claimed in claim 1 and comprising two or more light sources, each light source being disposed adjacent or substantially adjacent to a respective light receiving surface of the light-guide.

14. An illumination system as claimed in claim 1 wherein the light-guide further comprises a second light receiving surface and a second light reflecting surface, the second light reflecting surface being for reflecting light entering the light-guide through the second light receiving surface into the first part of the light-guide;
   and wherein the illumination system further comprises a second light source disposed adjacent or substantially adjacent to the second light receiving surface of the light-guide.

15. An illumination system as claimed in claim 14 wherein the second light receiving surface and the second light reflecting surface define a third part of the light-guide, and wherein the first part of the light-guide, the second part of the light-guide and the third part of the light-guide define an optically continuous refractive medium.

16. An illumination system as claimed in claim 1 and comprising two or more light sources, each light source being disposed adjacent or substantially adjacent to the light receiving surface.

17. An illumination system as claimed in claim 1 wherein the or each light source is arranged to emit light perpendicular or substantially perpendicular to the respective light receiving surface.

18. An illumination system as claimed in claim 1 wherein the or each light source is an LED.

19. An illumination system as claimed in claim 1 wherein the first part of the light-guide has a thickness of 0.3 mm or less.

20. An illumination system as claimed in claim 1 wherein the first part of the light-guide has a thickness of 0.2 mm or less.

21. An illumination system as claimed in claim 1 and further comprising a reflector disposed over the light-reflecting surface.

22. An illumination system as claimed in claim 14 and further comprising a second reflector disposed over the second light-reflecting surface.

23. An illumination system as claimed in claim 1 and further comprising a third reflector disposed over a region of the light-receiving surface where no light source is provided.

24. An illumination system as claimed in claim 14 and further comprising a fourth reflector disposed over a region of the second light-receiving surface where no second light source is provided.

25. An illumination system as claimed in claim 1 wherein the profile of the light reflecting surface varies across the breadth of the light guide.

26. An illumination system as claimed in claim 25 wherein the light reflecting surface comprises one or more segments, a cross-section through the or each segment along the breadth of the light-guide having a curved profile.

27. An illumination system as claimed in claim 26 wherein the or each light source is disposed above a corresponding segment.

28. An illumination system as claimed in claim 26 wherein each segment is a portion of the surface of a solid of revolution.

29. An illumination system as claimed in claim 28 where the or each axis defining the solid(s) of revolution is on the opposite side of the light-guide to the light reflecting surface.

30. An illumination system as claimed in claim 28 where the or each axis defining the solid(s) of revolution is on the same side of the light-guide as the light reflecting surface.

31. A display comprising: a display device; and an illumination system as defined in claim 1 for illuminating the display device, a light input face of the display device being disposed adjacent to the surface for light emission of the light guide.

32. A display as claimed in claim 31 wherein the display device is a transmissive display device, and wherein the illumination system is disposed on the opposite side of the display device to an intended viewing position of the display device.

33. A display as claimed in claim 31 wherein the display device is a reflective or transflective display device, and wherein the illumination system is disposed on the same side of the display device as an intended viewing position of the display device.

* * * * *